Patented Jan. 18, 1944

2,339,348

UNITED STATES PATENT OFFICE 2,339,348

PROCESS FOR MAKING DICARBONYLIC COMPOUNDS

Raymond W. McNamee, South Charleston, and Jesse T. Dunn, Charleston, W. Va., assignors to Carbide and Carbon Chemicals Corporation, a corporation of New York No Drawing. Application July 7, 1943, Serial No. 493,708

8 Claims. (Cl. 260—603)

Dicarbonylic compounds may be obtained at present by careful oxidation of dihydric alcohols with chemical oxidizing agents, notably nitric acid and selenium dioxide. The disadvantages of such methods are the cost of the oxidizing agents required and the explosive and toxic hazards involved.

It has been proposed to manufacture dicarbonylic compounds by direct oxidation of dihydric alcohols with molecular oxygen in amounts less than that theoretically required, i. e., less than one mol of oxygen per mol of the dihydric alcohol. This method of operation suffers from the disadvantage that lower oxidation products of the dihydric alcohols than dicarbonylic compounds often result and the dicarbonylic compounds which are formed have a pronounced tendency to react with the excess dihydric alcohol to form high-boiling, stable acetals or other complex condensation products. Under certain conditions, as pointed out in our copending application Serial No. 348,438, filed July 30, 1940, which will be referred to in more detail later, these disadvantages may be avoided but the conditions of the oxidation are then sufficiently severe to cause undesirably large amounts of monocarbonylic compounds and carbon oxides to be formed.

This invention provides specific improvements in the process for making aliphatic dicarbonylic compounds, notably dialdehydes, diketones, and ketoaldehydes, containing up to five carbon atoms, by the catalytic vapor phase oxidation with molecular oxygen of alkylene glycols and polyalkylene glycols, in which the alkylene group of the glycols contains up to five carbon atoms. (In subsequent descriptions the term "glycols" will be used to include both monoalkylene glycols and polyalkylene glycols.) According to this invention, the amount of carbon oxides and monocarbonylic compounds produced, which tend to form in a greater or lesser degree depending on the conditions, is minimized by the inclusion in the reaction zone of a repressant for the oxidations giving rise to these compounds. Also, by means of this invention, a substantially complete conversion of the glycols to oxidation products may be obtained, and no significant amounts of reaction products of the glycols with the dicarbonylic compounds are formed. Under these circumstances, the inclusion in the oxidation zone of a repressant for reactions giving rise to carbon oxides and monocarbonylic compounds causes the desired dicarbonylic compounds to be obtained with high efficiency.

The primary object of the invention is the preparation of glyoxal and pyruvic aldehyde by the oxidation of ethylene glycol or propylene glycol, or polyethylene- or polypropylene glycols, such as the di-, tri-, tetra-, penta-, or hexaethylene or propylene glycols. Other dicarbonylic compounds to which the invention relates include diacetyl, prepared by the oxidation of 2,3 butylene glycol; malonic dialdehyde, prepared by the oxidation of 1,3 propylene glycol; formyl acetone, from the oxidation of 1,3 butylene glycol; succinic dialdehyde, from the oxidation of 1,4 butylene glycol; and laevulinic aldehyde, from the oxidation of 1,4 amylene glycol.

Glyoxal and pyruvic aldehyde are chemicals of interesting and unusual properties. Glyoxal is a greenish-yellow solid melting at 15° C. and boiling at 51° C. It is difficult to isolate in the monomeric form because it polymerizes readily and because it readily forms a colorless hydrate or polymeric hydrate with water. Pyruvic aldehyde is a low-boiling liquid of similar properties. Both chemicals are extremely reactive by virtue of the two carbonyl groups which they contain and they are useful as intermediates in a variety of syntheses. By means of this invention, these products may be produced in economic yields which enables their reactive characteristics to be utilized industrially.

In the oxidation of the designated glycols to the corresponding dicarbonylic compounds, there is a tendency for rupture of a carbon-to-carbon linkage to occur and for monocarbonylic or carboxylic compounds of a lower number of carbon atoms than the glycol to be formed. In addition there is a tendency for the glycols to be destructively oxidized to oxides of carbon and to water. These tendencies are accentuated if a substantial excess of molecular oxygen is present in the oxidation zone. As described and claimed in our copending application Serial No. 348,438, it is desirable to use an excess of oxygen (at least 1.8 mols of oxygen per mol of glycol) over that required to convert each carbinol group of the glycol to a carbonyl group to prevent the formation of lower oxidation products of the glycols than the corresponding dicarbonylic compounds and of high-boiling, relatively stable derivatives of the dicarbonylic compounds with the unchanged glycols. In the formation of glyoxal or pyruvic aldehyde by the direct oxidation of ethylene or propylene glycol the tendency toward the formation of formaldehyde and toward destructive oxidation of the glycol to oxides of carbon is pronounced.

According to the present invention, it has been found that these tendencies may be suppressed or substantially eliminated by including in the oxidation zone containing the molecular oxygen and glycol vapors, small controlled amounts of hydrogen halides. These materials act as selective repressants for the severe oxidations which rupture a carbon-to-carbon linkage of the glycols or cause their complete destruction. By virtue of this selective repressant action, high yields of the desired polycarbonylic compounds are produced since the glycols may be practically completely converted to oxidation products, by employing a sufficiently high ratio of oxygen to glycol, without encountering large losses of the starting material through undesired oxidations.

Typical hydrogen halides which may be utilized as selective repressants are hydrogen chloride, hydrogen bromide, hydrogen fluoride, or hydrogen iodide. The repressants may be employed in the form of wet or dry vapors. The amount of repressant which is required is, as stated before, small, and convenient operating limits are between 0.002% and 0.30% by volume of the total amount of gases present or passing through the oxidation zone. Under the usual operating conditions this will amount to about 0.10% to about 15.0% by weight of the glycol introduced to the oxidation zone.

So far as present knowledge indicates, smaller amounts of repressant than the lower limit indicated above are not effective and greater amounts than the upper limit are not beneficial. Although it does not appear that such greater amounts render the catalyst completely inactive, the yields of dicarbonylic compounds obtained under these conditions are greatly reduced. However, this is partially compensated for by an increased efficiency of the process because the amounts of monocarbonylic compounds and carbon dioxide produced are correspondingly extremely small. Another factor, moreover, which makes the use of greater amounts of repressant seem undesirable is that, as a consequence of the relationships discussed above, free glycol will be present in the oxidation products and, it will be recalled, the dicarbonylic compounds tend to react with the glycols under these circumstances to form high-boiling, relatively stable acetals.

The action of the repressant may perhaps be ascribed to the influence it exerts on the catalyst, either by a physical or chemical change of its surface. This influence is temporarily persistent and the repressant may be introduced intermittently with the reactants if desired. In operation, the amounts of the selective repressant added to the reactants are controlled according to the conditions prevailing in the oxidation zone. If unduly large amounts of monocarbonylic compounds and carbon dioxide are being formed, the amount of repressant introduced is increased. On the contrary, if it appears that the catalyst is becoming somewhat inactive in promoting the desired oxidation, the concentration of repressant in the oxidation zone is reduced. To provide for flexibility of control, the repressant is preferably added in vaporized form to the gases comprising the reactants rather than mixed with the liquid glycol to be oxidized.

The catalyst which may be selected for promoting the desired oxidation is preferably composed of copper and several forms of copper catalysts may be used. A particularly effective type is one composed of turnings of a copper alloy containing from 94.4% to 96% copper, from 3% to 4.5% silicon and from 1.0% to 1.1% manganese. A supported copper catalyst may be formed by impregnating particles of a catalyst support consisting of ceramically bonded fused aluminum oxide with a concentrated boiling solution of copper nitrate and roasting the resultant material at 400° C. until a firm deposit of copper oxide is obtained. Supported catalysts of this kind desirably contain from about 3% to about 8% copper. The copper oxide catalysts may also contain small amounts of manganese oxide as an adjuvant catalyst or they may be promoted by the addition of activated alumina. Such catalysts are very active but they necessitate close control of the reaction. Other metal and metal oxide oxidation catalysts, notably silver, silver oxide, and molybdic oxide promoted by titanium oxide have outstanding catalytic action on the oxidation of the glycols and good yields of dicarbonylic compounds have been obtained in the presence of these catalysts.

The oxidation temperature, and the rate of feed of the glycol to the oxidation zone are not critical, but preferred operating ranges exist. Temperatures within the range of 225° C. to 450° C. are the desired operating levels and the preferred temperature is between 275° C. and 350° C. The rate of feed of the glycol to the oxidation zone may vary widely; the desired operating range being between 50 to 250 grams per hour per liter of catalyst space.

As described in our copending application, Serial No. 348,440, filed July 30, 1940, it is preferred to carry out the oxidation reaction in converters made of materials, other than iron, which do not exert adverse catalytic action on the desired oxidation. These materials include aluminum, copper, alloys of copper, and the iron-nickel-chromium alloys commonly known as stainless steel.

The following example illustrates several features of the invention:

Oxidation of ethylene glycol

A large-scale experiment on the oxidation of ethylene glycol to glyoxal was carried out. The apparatus consisted of a tube of a copper-silicon-manganese alloy 25 feet long and 1 inch in diameter. A length of 15 feet of the tube was filled with 2.5 liters of a catalyst prepared by impregnating particles of ceramically bonded fused aluminum oxide with a boiling solution of copper nitrate (specific gravity 1.75 at 135° C.) and roasting the resultant material at 400° C. until a deposit of copper oxide was formed. The amount of copper oxide on the catalyst support was about 5% by weight. Silver or other metal or metal oxide oxidation catalysts may be substituted for the copper catalyst.

Ethylene glycol was fed in vapor form to the oxidation zone at a temperature of 325° C. at the rate of 8.92 grams (0.144 mol) per hour along with 120 liters of air (1.12 mols of oxygen) per hour and 120 liters of nitrogen per hour. During the first 48 minutes of the run, no repressant was included with the vapors, and the temperature rose to 351° C. and the concentration of carbon dioxide in the exit gases rose to 1.75%. This indicated that about 65% of the glycol fed was then being destructively oxidized to carbon dioxide and water. Hydrochloric acid was then introduced by bubbling air into concentrated hydrochloric acid through a 5 mm. capillary tubing, and mixing the air bubbles saturated with hydrochloric acid with the vapors going to the oxidation zone. The rate of flow of the air bubbles through the concentrated hydrochloric acid was initially 24 bubbles per minute. After 9 minutes of operation with the repressant at this concentration, the temperature had decreased to 340° C., and the concentration of carbon dioxide had dropped to 1.1%.

For the next 23 minutes, the rate of introducing the repressant was 7 bubbles per minute, at which time the temperature was 335° C., and the concentration of carbon dioxide was 0.9%. For 2 hours and 10 minutes, the rate of introducing repressant was about 30 bubbles per minute, and, at the end of this period, the temperature was 326° C. and the carbon dioxide concentration in the exit gases was 0.50. These conditions were then maintained for the next 2 hours and 40 minutes by feeding 8 bubbles per minute of the repressant.

The inhibitor supply was then shut off, and for 30 minutes the operating conditions remained static. Then the concentration of carbon dioxide began to rise, and at the end of the next hour and one-half, it had risen to 1.10% and the temperature had increased to 332° C. The flow of inhibitor was then resumed at the rate of 6 bubbles per minute. After 30 minutes, the temperature was 325° C., and the concentration of carbon dioxide was 0.75. The rate of introducing repressant was increased to 12 bubbles per minute during the next 45 minutes, and the percentage of carbon dioxide in the exit gases declined to 0.45%, which indicated that then only 16% of the glycol fed was being destructively oxidized to carbon dioxide and water.

The over-all yield of glyoxal was about 35% during the experiment, and the yield of formaldehyde was about 5%. Since the repressant was purposely not employed during part of the experiment in order to demonstrate the control aspects of the invention, the yield of glyoxal during the periods when the repressant was employed was much higher. Yields of glyoxal of about 50% are typical of the results which may be obtained by the use of such repressants.

Glyoxal may be removed in the form of its hydrate from the exit gases by passing them through a water scrubber and the effluent gases from the scrubber may be recycled if desired. The hydrate of glyoxal may be in polymeric form, and the term "hydrate" is employed to include glyoxal in any association with water. Purified glyoxal can be recovered from the aqueous solution formed in the scrubber by adding a solvent for the glyoxal, such as dioxane, to the aqueous solution, removing most of the excess water by azeotropic distillation with benzene and then distilling over the dioxane along with monomeric glyoxal. This distillate is caught in water and the dioxane may be removed therefrom by distillation or extraction. The glyoxal may also be flash evaporated from the dry dioxane solution by passing the solution into a kettle containing a hot liquid, such as dimethoxy tetraethylene glycol or other dialkyl ethers of glycol or polyglycols.

Modifications of the invention other than as described in the foregoing example will be apparent to those skilled in the art and are included within the scope of the invention as defined by the appended claims.

This application is related to our copending application Serial No. 348,439, filed July 30, 1940, in which the repressants for undesired oxidations in the oxidation of glycols to dicarbonylic compounds are halogens and halogenated organic compounds.

We claim:

1. Process for making one of the group consisting of aliphatic dicarbonylic compounds having up to five carbon atoms and hydrates and polymers of these compounds, which comprises catalytically oxidizing one of the group consisting of alkylene glycols and polyalkylene glycols, in which the alkylene group of the glycols contains up to five carbon atoms, with molecular oxygen in the presence of small controlled amounts of a repressant comprising a hydrogen halide.

2. Process for making one of the group consisting of aliphatic dicarbonylic compounds having up to five carbon atoms and hydrates and polymers of these compounds by catalytic, vapor phase oxidation, which comprises passing the vapors of one of the group consisting of alkylene glycols and polyalkylene glycols, in which the alkylene group of the glycols contains up to five carbon atoms, mixed with molecular oxygen, over one of the group consisting of metal and metal oxide oxidation catalysts at a temperature between 225° and 450° C., and controlling the amounts of monocarbonylic compounds and oxides of carbon formed by adding to the reactants between about 0.002% and about 0.30% by volume of the total gases present of a repressant comprising a hydrogen halide.

3. Process for making one of the group consisting of aliphatic dicarbonylic compounds having up to five carbon atoms and their hydrates and polymers which comprises mixing the vapors of one of the group consisting of alkylene glycols and polyalkylene glycols, in which the alkylene group of the glycols contains up to five carbon atoms, with an excess of molecular oxygen over that theoretically required for the formation of the carbonylic groups in said compounds by oxidation of the corresponding carbinol groups, passing the vapors over a silver oxidation catalyst at a temperature between 225° and 450° C., and controlling the amounts of monocarbonylic compounds and oxides of carbon formed by adding to the reactants small amounts of a repressant comprising hydrogen chloride.

4. Process for making one of the group consisting of aliphatic dicarbonylic compounds having up to five carbon atoms and their hydrates and polymers which comprises mixing the vapors of one of the group consisting of alkylene glycols and polyalkylene glycols, in which the alkylene group of the glycols contains up to five carbon atoms, with an excess of molecular oxygen over that theoretically required for the formation of the carbonylic groups in said compounds by oxidation of the corresponding carbinol groups, passing the vapors over a copper oxidation catalyst at a temperature between 225° and 450° C., and controlling the amounts of monocarbonylic compounds and oxides of carbon formed by adding to the reactants small amounts of a repressant comprising hydrogen chloride.

5. Process for making hydrates of glyoxal which comprises catalytically oxidizing the vapors of a glycol containing at least one oxyethoxy group with molecular oxygen in the presence of small controlled amounts of a repressant comprising a hydrogen halide.

6. Process for making hydrates of glyoxal which comprises mixing the vapors of a glycol containing at least one oxyethoxy group with an excess of molecular oxygen over that theoretically required for the formation of the carbonyl groups in the glyoxal by the oxidation of the corresponding carbinol groups, passing the vapors over one of the group consisting of metal and metal oxide oxidation catalysts at a temperature between 225° and 450° C., and controlling the amounts of formaldehyde and carbon dioxide formed by adding to the reactants small controlled amounts of a repressant comprising a hydrogen halide, and recovering a hydrate of glyoxal from the reaction products.

7. Process for making hydrates of glyoxal which comprises mixing the vapors of ethylene glycol with an excess of molecular oxygen over that theoretically required to oxidize each carbinol group to a carbonyl group, passing the vapors over a copper oxidation catalyst at a temperature between 225° and 450° C., controlling the amounts of formaldehyde and carbon dioxide formed by adding to the reactants small amounts of hydrogen chloride, and recovering a hydrate of glyoxal from the oxidation products.

8. Process for making hydrates of glyoxal which comprises mixing the vapors of ethylene glycol with an excess of molecular oxygen over that theoretically required to oxidize each carbinol group to a carbonyl group, passing the vapors over a silver oxidation catalyst at a temperature between 225° and 450° C., controlling the amounts of formaldehyde and carbon dioxide formed by adding to the reactants small amounts of hydrogen chloride, and recovering a hydrate of glyoxal from the oxidation products.

RAYMOND W. McNAMEE.
JESSE T. DUNN.